United States Patent [19]

Setoguchi et al.

[11] 4,254,851
[45] Mar. 10, 1981

[54] BUS BAR SWITCH FOR TROLLEY-TYPE TRANSPORTATION SYSTEM

[75] Inventors: Takanoru Setoguchi, Yokosuka; Yoshiaki Hidaka, Yokohama, both of Japan

[73] Assignee: Nissan Motor Company, Limited, Japan

[21] Appl. No.: 46,224

[22] Filed: Jun. 7, 1979

[30] Foreign Application Priority Data

Jun. 22, 1978 [JP] Japan ................................ 53-74909

[51] Int. Cl.³ .............................................. B60M 1/04
[52] U.S. Cl. ........................................ 191/31; 191/48; 191/49
[58] Field of Search .................... 191/31, 38, 32, 29 R, 191/25, 48, 49

[56] References Cited

U.S. PATENT DOCUMENTS

| 3,046,909 | 7/1962 | Gorjane | 191/38 X |
| 3,847,255 | 11/1974 | Laurent | 191/38 |

Primary Examiner—Richard A. Schacher
Attorney, Agent, or Firm—Lane, Aitken, Ziems, Kice & Kananen

[57] ABSTRACT

Two shiftable bus bar unit point sections are simultaneously shifted to allow one of the sections to align with a stationary bus bar unit point section. A coupler slides on the stationary point section toward the just aligned one of the shiftable point sections to couple the same with the stationary point section. The shifting of the shiftable point sections and the sliding of the coupler are controlled by an operating mechanism which employs a cam. A holding device covers sealingly the electrically dangerous exposed end of the other of the shiftable point sections.

8 Claims, 13 Drawing Figures

BUS BAR SWITCH FOR TROLLEY-TYPE TRANSPORTATION SYSTEM

FIELD OF THE INVENTION

The present invention relates in general to a trolley-type transportation system comprising an electric wheeled vehicle which runs along a bus bar unit by continuously collecting current from the unit, and more particularly to a bus bar switch by which a current collector device of the vehicle is transferred from one bus bar unit to another while the vehicle runs.

OBJECTS OF THE INVENTION

It is an object of the present invention to provide an improved bus bar switch by which a current collector device of an electric wheeled vehicle is assuredly transferred from one bus bar unit to another while running.

It is another object of the present invention to provide an improved bus bar switch which is water and dust proof.

It is still another object of the present invention to provide an improved bus bar switch having a safety apparatus which functions to cover a naked electrically dangerous end of an inoperating shiftable bus bar unit for protecting a man and/or any object from accidentally touching such dangerous end.

Other objects and advantages of the present invention will become apparent from the following description when taken in conjunction with the accompanying drawings.

DESCRIPTION OF A TROLLEY-TYPE TRANSPORTATION SYSTEM TO WHICH A BUS BAR SWITCH OF THE INVENTION IS APPLICABLE

Prior to describing in detail the construction of the bus bar switch of the invention, outlined explanation of the trolley-type electric wheeled vehicle which runs along a bus bar unit by collecting current from the unit will be made with reference to FIGS. 1A, 1B and 1C for clarification of the invention.

Figure 1A:
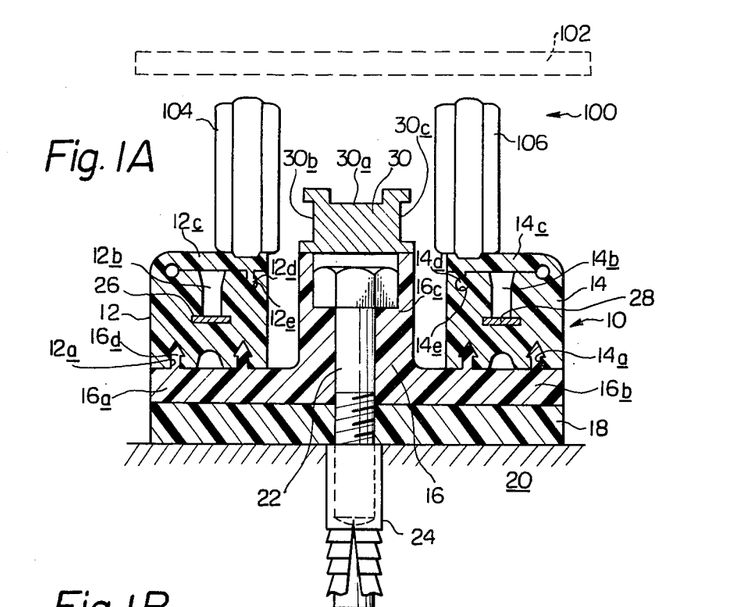
FIG. 1A is a sectional view of a bus bar unit, depicting a condition wherein the lid portions of the unit are forced to close by vertical rollers of a current collector device.
Figure 1B:
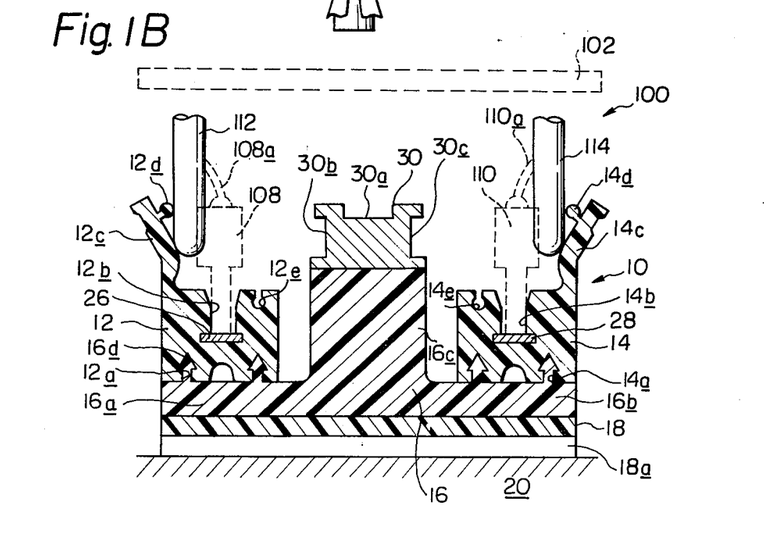
FIG. 1B is a view similar to FIG. 1A, but shows a condition wherein the lid portions of the unit are forced to open by rods of the current collector device for assuring sliding contact of current collecting shoes of the device with naked bus bars mounted in the unit.
Figure 1C:
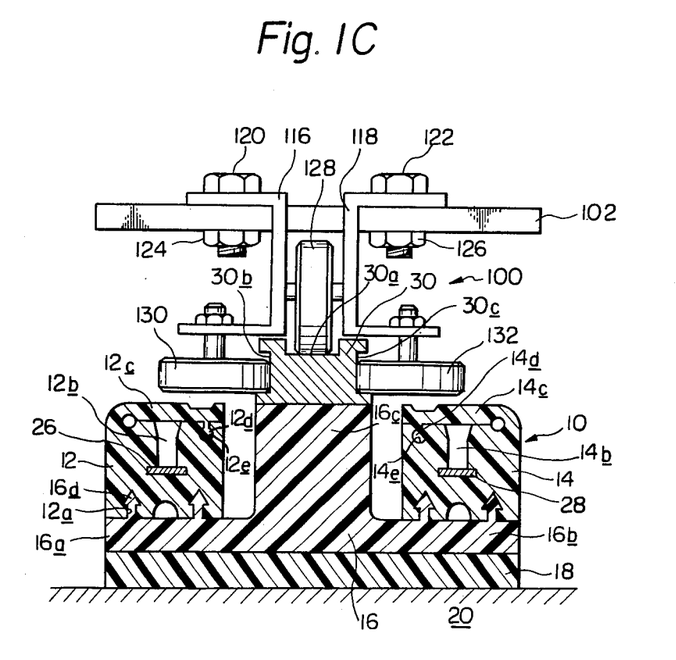
FIG. 1C is a sectional view of the bus bar unit at a position where vertical and horizontal guide rollers of the current collector device are rotatably received in respective tracks formed in a guide rail which is mounted on the bus bar unit.

Referring to FIGS. 1A, 1B and 1C, there is shown in sectional manner a bus bar unit 10 and several parts of a current collecting device 100 which is adapted to run on and along the bus bar unit 10. Only new essential parts such as 102, 104, 106, 108, 110, 112 and 114 of the current collector device 100 are shown in these drawings since such device 100 is substantially disclosed in U.S. patent application No. 1,351 filed on Jan. 3, 1979, assigned to the assignee of the present invention.

The current collector device 100 hereinshown comprises a base member 102 which is connected via a universally movable link mechanism to an electric wheeled vehicle (not shown) which runs on a trackway (20) along the bus bar unit 10. Paired front vertical rollers 104 and 106 (see FIG. 1A) are connected to the front section of the base member 102, while paired rear vertical rollers (not shown) are connected to the rear section of the base member 102. Paired current collecting shoes 108 and 110 (see FIG. 1B) are fixed via biasing means (not shown) to a generally middle section of the base member 102 to extend downward. Each shoe 108 or 110 is connected via a lead wire 108a or 110a to an electric motor mounted in the vehicle. Paired front rods 112 and 114 are fixed to the base member 102 to extend downward at a position between the front vertical rollers 104 and 106 and the current collecting shoes 108 and 110, while paired rear rods (not shown) are fixed to the base member 102 at a position between the rear vertical rollers and the collecting shoes 108 and 110. To the front and rear sections of the base member 102, respective guide roller units (see FIG. 1C) are mounted, each comprising a pair of brackets 116 and 118 fixed to the base member 102 by bolts 120 or 122 and nuts 124 or 126, a vertical roller 128 rotatably supported by the brackets 116 and 118, and two horizontal rollers 130 and 132 respectively held by the brackets 116 and 118, as shown.

The bus bar unit 10 hereinshown comprises a pair of bus bar containers 12 and 14 which are constructed of a flexible insulating material such as soft polyvinyl chloride (PVC). The containers 12 and 14 are secured to respective flange sections 16a and 16b of a stand member 16 which is constructed of a rigid insulating material such as rigid polyvinyl chloride (PVC). As shown, the containers 12 and 14 are arranged substantially symmetrically with respect to a central ridge section 16c of the stand member 16. The connection of the containers 12 and 14 to the flange sections 16a and 16b is made by latchably embedding longitudinally extending projections 16d (only one is numbered) formed on the flange sections 16a and 16b into corresponding longitudinally extending slits 12a and 14a of the containers 12 and 14, in a snap action manner. The stand member 16 is attached via a height adjusting soft plate 18 to a trackway 20 by means of bolts 22 which pass through the central ridge section 16c and the height adjusting plate 18 and are screwed to holders 24 embedded in the trackway 20, in a manner as shown in FIG. 1A. The height adjusting soft plate 18 is formed with a plurality of transversely arranged grooves 18a for increased flexibility thereof.

Each of the containers 12 and 14 has a longitudinally extending groove 12b and 14b within which a naked bus bar or current carrying cable 26 or 28 is tightly disposed to extend along the corresponding groove. Each container 12 or 14 has a longitudinally extending lid portion 12c or 14c which is hingedly united at one side to the body of the container 12 or 14. Each lid portion 12c or 14c has a sufficient width to cover the corresponding groove 12b or 14b and has at the laterally leading end portion thereof a longitudinally extending headed ridge 12d or 14d. These headed ridges 12d and 14d are latchably and respectively received in longitudinally extending slits 12e and 14e, formed in the bodies of the containers 12 and 14, when the lid portions 12c and 14c are pressed against the bodies of the containers 12 and 14 by the before-mentioned paired vertical rollers 104 and 106 of the current collector device 100. This will be understood from FIG. 1A. For assurance of latching to the headed ridges 12d and 14d, each slit 12e or 14e has an enlarged bottom section, as shown.

A guide rail 30 having one horizontal track 30a and two vertical tracks 30b and 30c is mounted on and secured to the top of the central ridge section 16c of the stand member 16 to extend along the same. Upon mounting of the current collector device 100 on the bus bar unit 10, the afore-mentioned vertical and horizontal guide rollers 128, 130 and 132 of the device 100 are respectively set in the tracks 30a, 30b and 30c, in a manner as shown in FIG. 1C.

In setting or mounting the current collector device 100 on the bus bar unit 10, the lid portions 12c and 14c are partially opened by, for example, manual work to put the current collecting shoes 108 and 110 into the corresponding grooves 12b and 14b of the containers 12 and 14. In this instance, the front rods 112 and 114 and the rear rods of the current collector device 100 take positions to hold the corresponding lid portions 12c and 14c open by contacting the back surfaces of the lid portions 12c and 14c, as is well shown in FIG. 1B. Furthermore, in this instance, the paired front vertical rollers 104 and 106 and the paired rear vertical rollers take positions to press the corresponding lid portions 12c and 14c against the bodies of the containers 12 and 14 to accomplish latching engagements between the lid portions and the containers as is well shown in FIG. 1A. Upon proper setting of the current collector device 100 to the bus bar unit 12, the current collecting shoes 108 and 110 are in sliding contact with the naked bus bars 26 and 28 to transmit current from the bus bars 26 and 28 to the electric motor in the vehicle.

While the vehicle runs along the bus bar unit 10 with the current collector device 100 in one direction, for example in the direction of the front side with respect to the paper surface on which the drawings are carried, the front rods 112 and 114 act to continuously open the lid portions 12c and 14c of the containers 12 and 14 and the paired rear vertical rollers act to close the just opened lid portions 12c and 14c. When the vehicle runs in the reversed direction, the rear rods (not shown) act to continuously open the lid portions 12c and 14c and the paired front vertical rollers 104 and 106 act to close the just opened lid portions 12c and 14c. Thus, it will be appreciated that the bus bar receiving grooves 12b and 14b are kept closed except small portions where the current collector device 100 is just located. In other words, the grooves 12b and 14b are usually closed by the corresponding lid portions 12c and 14c. Thus, the bus bars 26 and 28 which are naked are prevented from being exposed to rain and/or contaminated with mud thereby being protected from rust.

DESCRIPTION OF A BUS BAR SWITCH ACCORDING TO THE INVENTION

As has been mentioned before, an essential object of the present invention is to provide an improved bus bar switch which is applicable to the above-mentioned trolley-type transportation system for permitting the current collector device 100 to be assuredly transferred from one bus bar unit to another.

Figure 2:
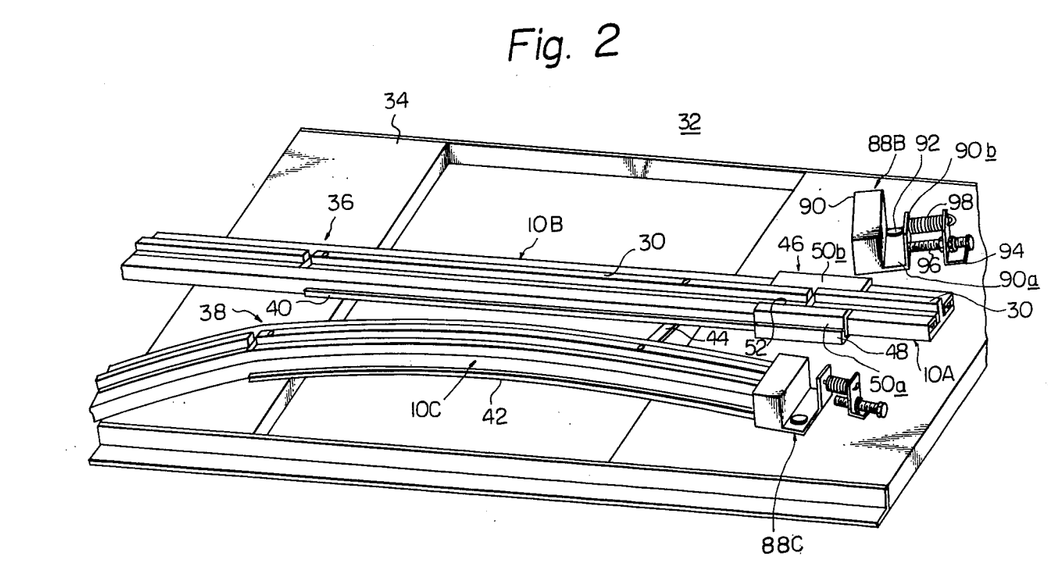
FIG. 2 is a perspective view of a bus bar switch according to the invention, depicting one condition thereof.
Figure 3:
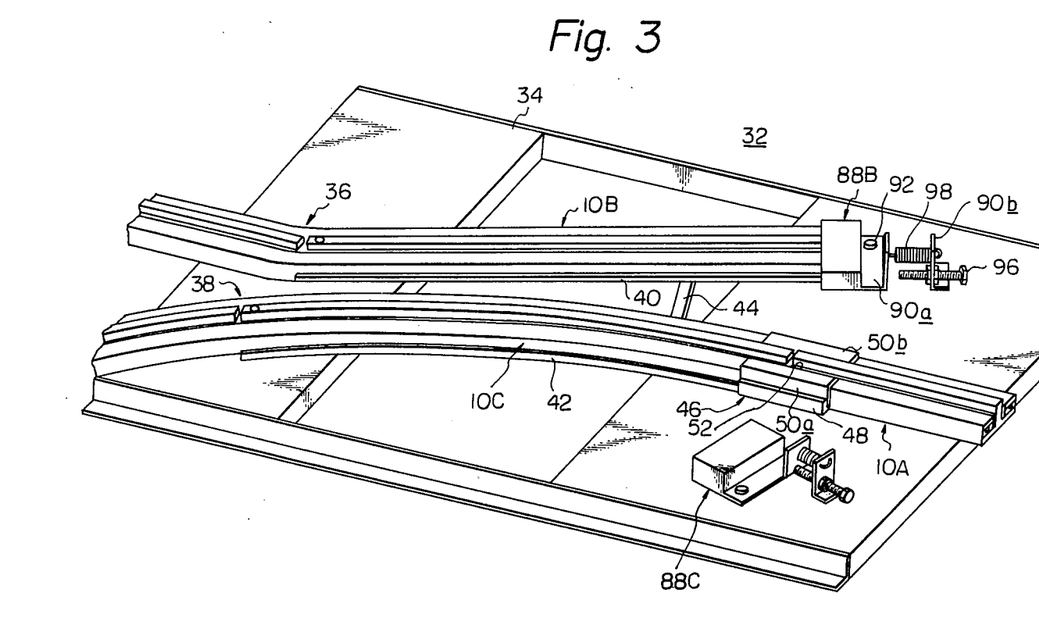
FIG. 3 is a view similar to FIG. 2, but shows another condition of the bus bar switch.
Figure 4:
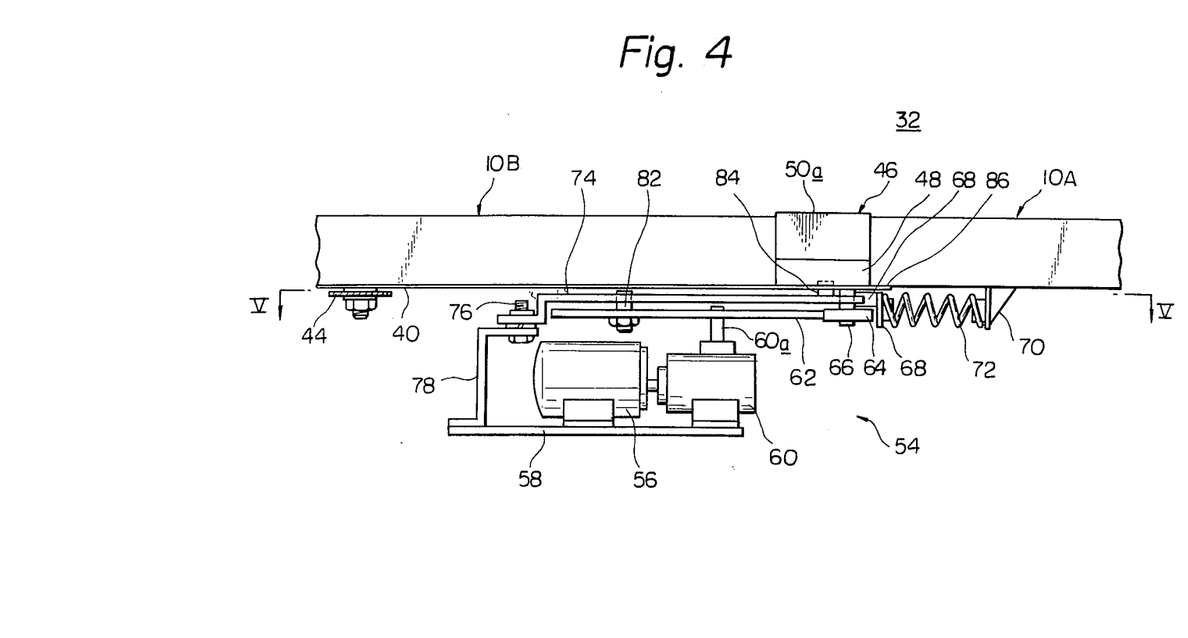
FIG. 4 is a side view of the bus bar switch, but shows an essential part of the switch, the view being taken along the line IV—IV of FIG. 5.

Referring to FIGS. 2 to 11, particularly to FIGS. 2 to 4, there is shown a bus bar switch embodying the invention, the switch being generally designated by numeral 32.

The switch 32 comprises mounting board 34 on which first, second and third point sections 10A, 10B and 10C of the bus bar unit 10 are mounted. As will be understood from FIGS. 2 and 3, the first and second point sections 10A and 10B act to provide the current collector device 100 with a straight track, while the first and third point sections 10A and 10C act to provide the device 100 with a curved track. The first point section 10A is fixed to the mounting board 34 and stationary with respect to the board 34 while the second and third point sections 10B and 10C are horizontally swingable about respective pivot portions 36 and 38. Although not well shown in the drawings, each pivot portion is formed by removing a part of the component of the bus bar unit except the bus bar containers 12 and 14 which are flexible as has been mentioned. The second and third point sections 10B and 10C are tightly and respectively mounted on metallic holders 40 and 42 which are movable with the sections 10B and 10C on the mounting board 34. The metallic holders 40 and 42 are connected with each other by a link 44 so that synchronous swinging movement is achieved between these point sections 10B and 10C.

Longitudinally slidably mounted on the first point section 10A is a coupler 46 which functions to tightly couple the first point section 10A with either the second point section 10B or the third point section 10C in a manner shown in FIGS. 2 and 3, respectively. The coupler 46 comprises a metallic channel member 48 consisting of a bottom wall and two opposite side walls. Two covering members 50a and 50b, each having a generally L-shaped cross section and constructed of a flexible insulating material such as rubber material, are respectively fixed to the side walls of the channel member 48 in a manner to form a rectangular prism-like housing, leaving between the cover members 50a and 50b a slot 52. The coupler 46 thus formed is longitudinally slidably mounted about the first point section 10A with the slot 52 thereof from which the guide rail 30 of the bus bar unit 10 is projected outwardly. When coupling of the first point section 10A with the second or third point section 10B or 10C is required, the coupler 46 is slidably moved leftward to such an extent as to receive therein the leading end of the second or third point section 10B or 10C. This will become more apparent as the description proceeds. The swinging movement of the second and third point sections 10B and 10C and the sliding movement of the coupler 46 are timingly controlled by the next-mentioned operating mechanism 54.

As will be seen from FIG. 4, the operating mechanism 54 is mounted in the back side of the mounting board 34 and comprises an electric motor 56 mounted on a mounting plate 58. A reduction gear 60 is also mounted on the plate 58 and is driven by the motor 56. A cam plate 62 is fixed to an output shaft 60a of the reduction gear 60 and is horizontally rotatable about the axis of the shaft 60a. As is well shown in FIG. 5, the cam plate 62 has a highly protruding peripheral section 62a and a less protruding peripheral section 62b, each section being substantially symmetrical with respect to an imaginary line which passes through the respective middles of these peripheral sections 62a and 62b. Contacting the periphery of the cam plate 62 is a cam follower 64 which is rotatably supported by a pin 66 extending downwardly from the channel member 48 of the coupler 46. The cam follower 64 and thus the coupler 46 are biased in the leftward direction in FIG. 4 by biasing means which comprises a retainer 68 slidably abutting on the pin 66, a bracket 70 secured to the first point section 10A and a spring 72 disposed between the retainer 68 and the bracket 70. With this, it will be appreciated that the coupler 46 is biased to move in the leftward direction in FIGS. 2 and 3, that is in a direction to come off from the first point section 10A. (For facilitation of the drawings, such biasing means is omitted from FIGS. 6 to 8.)

Figure 5:
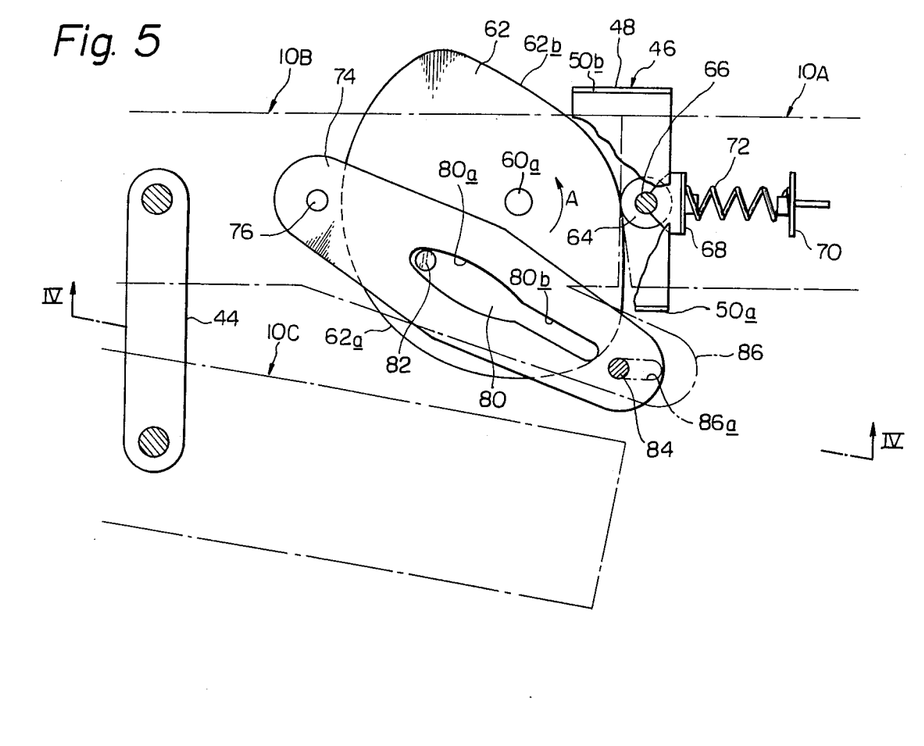
FIG. 5 is a view taken along the line V—V of FIG. 4.

The operating mechanism 54 further has a lever 74 which is located above the cam plate 62 and pivotally connected at its one end via a pivot pin 76 to a bracket 78 extending from the mounting plate 58. As is shown in FIG. 5, the lever 74 has at the middle section thereof an opening 80 which consists of an oval section 80a and an elongate section 80b. Projecting into the opening 80 is a stud 82 which upwardly extends from the cam plate 62, more particularly from a portion which is located near the highly protruding peripheral section 62a. The levers 74 further has, as is best seen from FIG. 4, at the other end thereof an upwardly extending stud 84 which projects into an elongate opening 86a formed in an arm 86. The arm 86 is integrally connected to the second point section 10B of the bus bar unit 10.

OPERATION OF THE BUS BAR SWITCH

For easy understanding, description of the operation will be commenced with respect to a case wherein the condition of FIG. 2 is changed to the condition of FIG. 3. Under the condition of FIG. 2, the hereinabove-mentioned parts such as 62, 64 and 74 take the positions shown by FIG. 5 wherein the cam follower 64 abuts upon the less protruding peripheral section 62b of the cam plate 62, and the stud 82 projecting from the cam plate 62 is located at the leftmost position (in FIG. 5) of the opening 80 of the lever 74.

Figure 6:
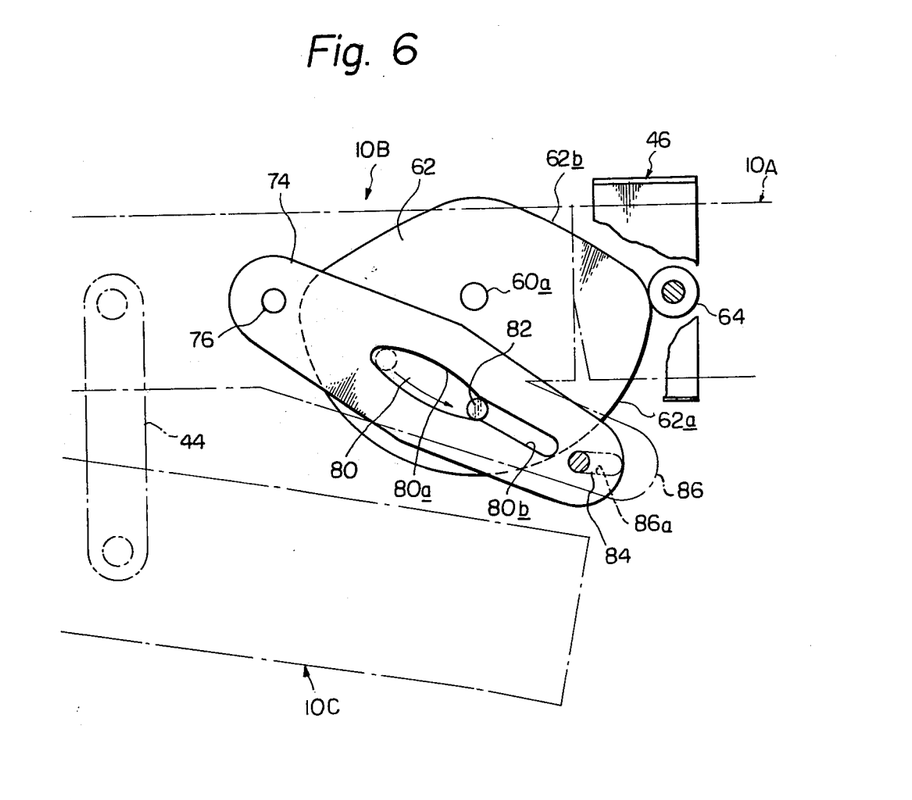
FIGS. 6 to 9 are views similar to FIG. 5, showing various conditions of the bus bar switch respectively.

When the cam plate 62 is rotated in the direction of arrow A (see FIG. 5) upon energization of the electric motor 56 and takes a position shown by FIG. 6 wherein the cam follower 64 rides on the beginning of the highly protruding peripheral section 62a, the coupler 46 connected to the cam follower 64 via the pin 66 is synchronously moved rightward, that is toward the first point section 10A of the bus bar unit 10, against the biasing force of the spring 72 to a position to disengage the second point section 10B therefrom. During this, the lever 74 is kept stationary because the stud 82 moves in the oval section 80a of the opening without pushing the lever 74.

Figure 7:
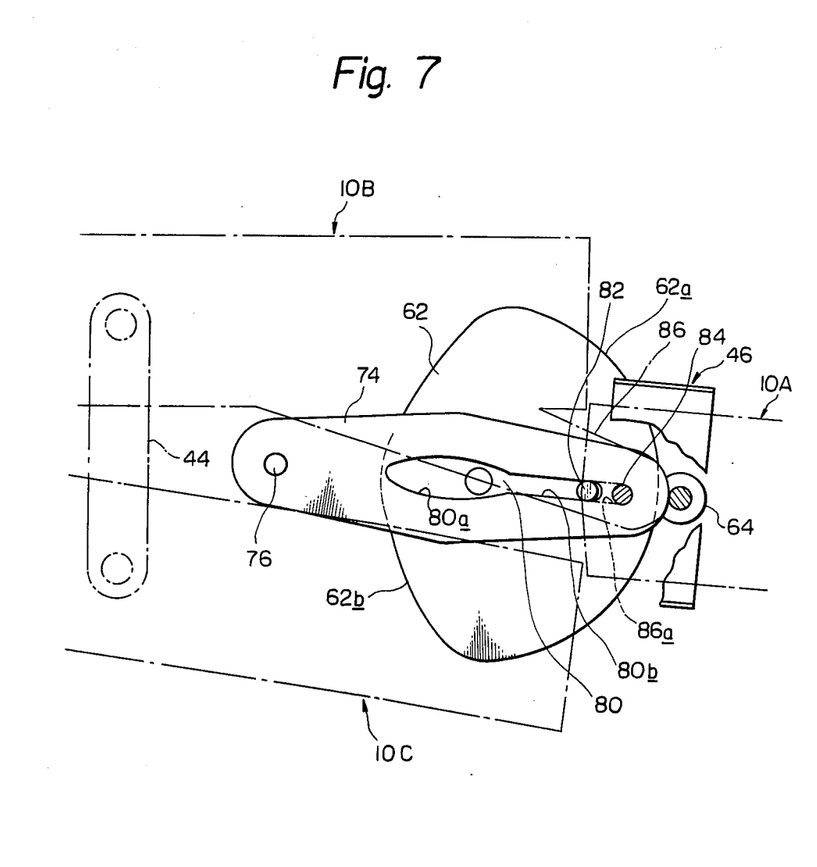

When the cam plate 62 is further rotated in the same direction and takes a position shown by FIG. 7 wherein the cam follower 64 rides on the generally middle of the highly protruding peripheral section 62a, the coupler 46 maintains the inoperating position to disengage the second point section 10B, but the lever 74 is rotated in the same direction as the cam plate 62 about the pivot pin 76 because the stud 82 is moved into the elongate section 80b of the opening 80, pushing the lever 74 in such direction. With such rotation of the lever 74, the unit of the second and third point sections 10B and 10C swings in the same direction as the lever 74 because the arm 86 connected to the unit is connected to the lever 74 through the link mechanism consisting of the stud 84 and the elongate opening 86a.

Figure 8:
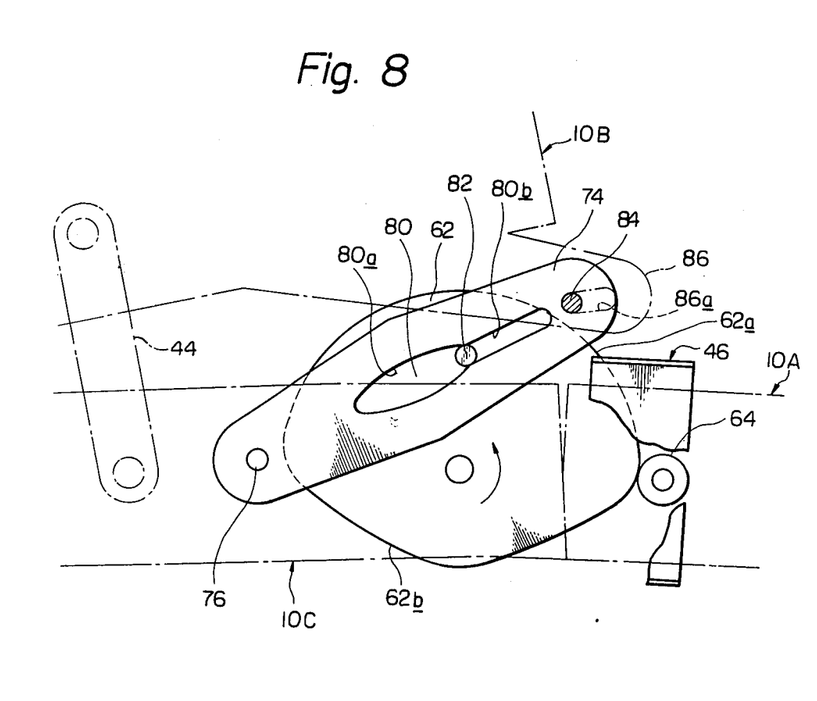

When the rotation of cam plate 62 further proceeds and the cam plate 62 takes a position shown by FIG. 8 wherein the cam follower 64 rides on the end of the highly protruding peripheral section 62a, the unit of the second and third point sections 10B and 10C of the bus bar unit 10 is brought to a position where the third point section 10C is aligned with the first point section 10A. During this movement, the coupler 46 still maintains the inoperating position, and the stud 82 moves toward the oval section 80a of the opening 80.

Figure 9:
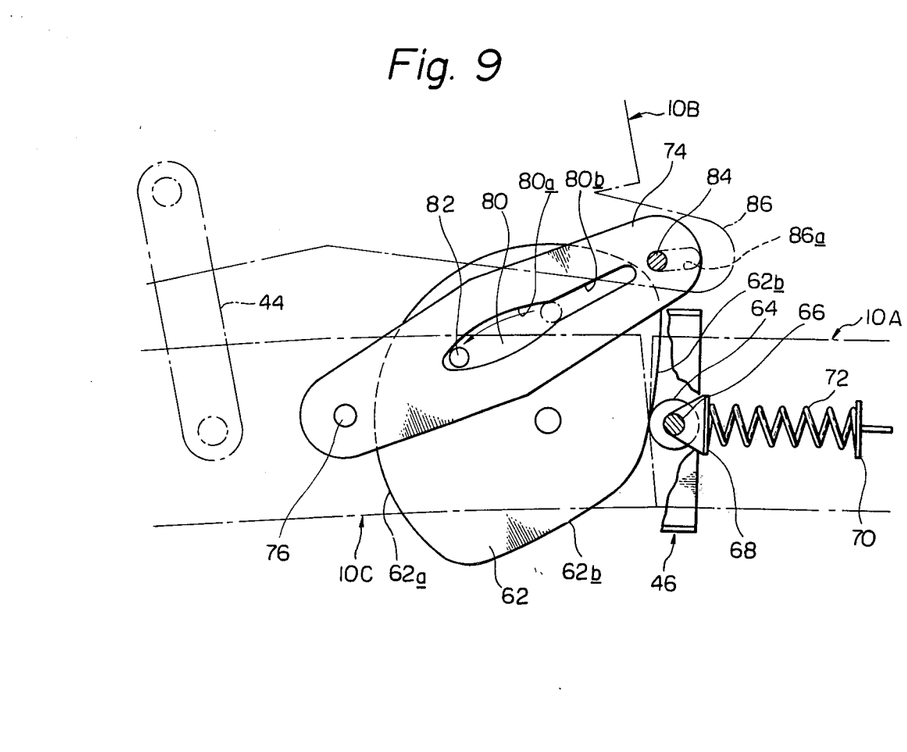
Figure 10:
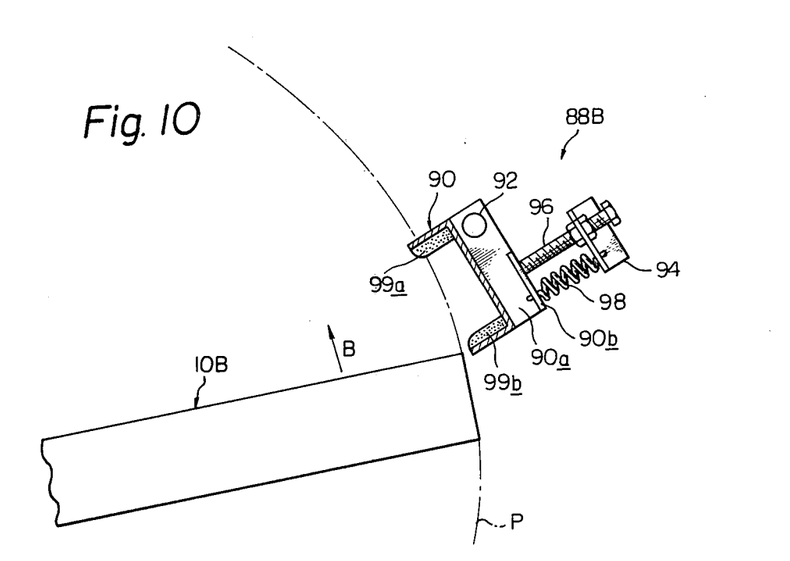
FIG. 10 is a plan view of an inoperating point section holding device which incorporates with the bus bar switch, showing one condition thereof.

When the cam plate 62 finally takes a position shown by FIG. 9 wherein the cam follower 64 again rides on the less protruding peripheral section 62b, the coupler 46 comes back to the initially set position receiving therein the end of the third point section 10C thereby coupling it with the first point section 10A. During this, the lever 74 is kept stationary because, under this, the stud 82 moves within the oval section 80a of the opening 80 toward the initially set position without pushing the lever 74.

Now, it should be noted that, under movement of the current collecting device 100 on the coupler 46, the cover member 50a and 50b are forced to open by the rods 112 and 114 of the collecting device 100.

The operation in the other case wherein the condition of FIG. 3 is changed to the condition of FIG. 2 is similar to, but reverse with respect to the above-explained operation. When such changing is required, the rotational direction of the electric motor 56 should be changed to allow the cam plate 62 to rotate in the reverse direction. During the reverse rotation of the cam plate 62 from the condition of FIG. 9 to that of FIG. 5, rightward shifting of the coupler 46 permitting the disengagement of the third point section 10C from the coupler 46, clockwise rotation of the unit of the second and third point sections 10B and 10C, alignment between the second and first point sections 10B and 10A, and coupling between these sections 10B and 10A by the coupler 46 occur in this order.

For easy handling of the bus bar switch 32, it is preferable to use a limit switch (not shown) constructed to stop the feed to the electric motor 56 upon detecting a predeterined rotational movement of the cam plate 62, and a changer constructed to change the rotational direction of the electric motor 56 in response to the stop of the feed to the motor 56. With this, the handling of the bus bar switch 32 can be made by only switching the motor 56 on.

The following description is directed to inoperating point section holding devices 88B and 88C which are also mounted on the mounting board 34 as is clear from FIGS. 2 and 3. Each device 88B or 88C functions to sealingly hold the exposed electrically dangerous end of the shiftable point section 10B or 10C when the corresponding point section is in an inoperative condition. As these devices 88B and 88C are substantially identical in construction, explanation will be made with respect to one of these, for example to the device 88B.

As is illustrated in FIGS. 2 and 3, the inoperative point section holding device 88B comprises a box member 90 having an interior matching with the exterior of the end of the second point section 10B. The box member 90 has an extension consisting of a horizontal section 90a and a vertical section 90b, and is horizontally swingably connected to the mounting board 34 via a pivotting bolt 92. A bracket 94 is fixed to the mounting board 34 at a position near the box member 90 and supports thereon an adjustable stopper bolt 96. As is best seen from FIG. 10, the stopper bolt 96 functions to limit the counterclockwise rotation of the box member 90 about the pivotting bolt 92. An extension spring 98 is stretched between the bracket 94 and the vertical section 90b of the box member 90 to bias the box member 90 to abut upon the stopper bolt 96 at the vertical section 90b. Seals 99a and 99b (see FIG. 10) made of a rubber material are attached to inner surfaces of respective side walls of the box member 90 so that when the end of the point section 10B is received into the box member 90 in a manner as will be mentioned hereinafter, these seals 99a and 99b abut upon the lateral sides of the end of the section 10B, that is, the outer sides of the bus bar containers 12 and 14 positioned at the end of the section 10B. As will be understood from FIG. 10, positioning the device 88B with respect to the point section 10B is made such, that under the rest condition of the device 88b, the seal 99a is located on a path "P" swept out by the end of the second point section 10B.

Figure 11:
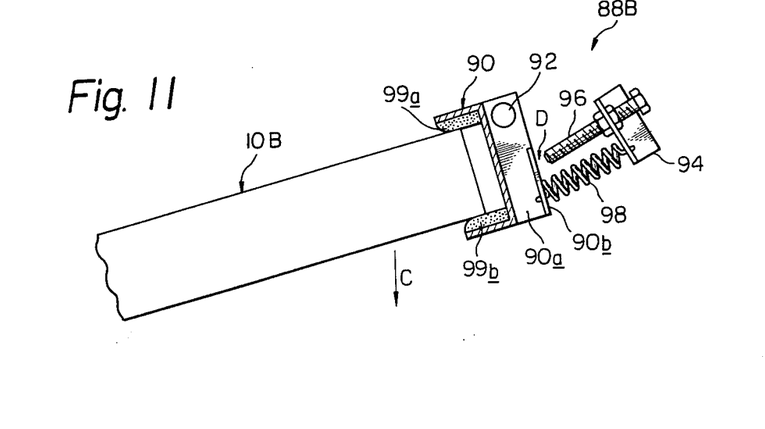
FIG. 11 is a view similar to FIG. 10, but shows another condition of the holding device.

When the point section 10B is moved or swung in the direction of arrow B (see FIG. 10) in response to the switching operation by the bus bar switch 32, the end of the section 10B is brought into engagement with the seal 99a to push it in the same direction and is finally fitted into the box member 90 by slightly rotating the box member 90 in the clockwise direction about the pivotting bolt 92 against the biasing force of the spring 98, as is shown by FIG. 11. Thus, the second point section 10B which is inoperative in this state is tightly held by the holding device 88B, leaving a slight distance "D" (see FIG. 11) between the tip of the stopper bolt 96 and the vertical section 90b of the box member extension. By the provision of the distance "D," the shifting of the second point section 10B in the direction of "C" is assuredly made.

From the above description, it will be appreciated that since the end of the shiftable bus bar unit, such as the end of the second or third point section 10B or 10C where the bus bars are exposed is safely covered by the holding device 88a or 88B when it is inoperative, the end is prevented from being exposed to rain and/or contaminated with dust. Further, by the provision of the holding device, troubles caused by short circuit of the two exposed bus bars in inoperating condition of the corresponding point section 10B or 10C are eliminated.

What is claimed is:

1. A bus bar switch for a trolley-type transportation system including an electric motor vehicle, a current collector device carried by said vehicle, and a bus bar unit on which said current collector device rides to transmit current carried by said bus bar unit to said vehicle to drive the same, said bus bar switch comprising:

a first point section of said bus bar unit which is stationary and has a first end;

a second point section of said bus bar unit which is swingable about a pivotal portion thereof to allow a second end thereof to align with said first end;

a third point section of said bus bar unit which is swingable about a pivotal portion thereof to allow a third end thereof to align with said first end;

a link spanned between said second and third point sections to assure synchronous swinging movements of them about the respective pivotal portions allowing said second and third ends of them to selectively align with said first end;

a coupler for coupling one of said second and third ends with said first end by receiving therein both said one and said first end, said coupler being slidable along said first point section from an inoperative position wherein said coupler fails to have a section thereof projected longitudinally outwardly from said first end, to an operative position wherein said coupler succeeds in having a section thereof projected longitudinally outwardly from said first end;

operating means for operating both the unit of said second and third point sections and said coupler in such a manner that when both of said second and third ends are away from said first end, said coupler is kept in said inoperative position and when alignment between one of said second and third ends and said first end becomes established, said coupler is brought into said operative position thereby to couple said one with said first end; and holding devices for selectively and sealingly holding said second and third ends when these ends are away from said first end.

2. A bus bar switch as claimed in claim 1, in which said operating means comprises:

a cam plate rotatable about a portion thereof;

first means for moving said coupler in fore-and-aft direction along said first point section in accordance with the configuration of the cam surface of said cam plate; and second means for swingably moving the unit of said second and third point sections about the respective pivotal portions thereof from one position to another position in response to rotation of said cam plate, said one position being a position wherein one of said second and third ends aligns with said first end, said another position being a position wherein the other of said second and third ends aligns with said first end.

3. A bus bar switch as claimed in claim 2, in which said first means comprises:

a cam follower rotatably abutting on said cam surface of said cam plate;

a pin having one end carrying said cam follower and the other end fixed to said coupler; and biasing means for biasing said cam follower toward said cam surface.

4. A bus bar switch as claimed in claim 3, in which said biasing means comprises:

a retainer slidingly abutting on said pin;

a bracket fixed to said first point section; and a spring disposed between said retainer and said bracket.

5. A bus bar switch as claimed in claim 3, in which said second means comprises:

a lever pivotted at one end and having at the generally middle section thereof an opening consisting of an oval section and an elongate section;

a first stud fixed to said cam plate and projected into said opening;

a second stud fixed to the other end of said lever; and an arm fixed to said second point section and having an elongate opening into which said second stud is projected.

6. A bus bar switch as claimed in claim 1, in which said coupler comprises:

a channel member consisting of a bottom wall and two opposite side walls; and two covering members each having a generally L-shaped cross section and constructed of a flexible insulating material, said covering members being respectively fixed to said side walls of said channel member in a manner to form a rectangular prism-like housing, leaving a slot between said covering members.

7. A bus bar switch as claimed in claim 1, in which each of said holding devices comprises:

a box member having an interior matching with the exterior of one of said second and third ends, said box member being swingable about a portion thereof;

a stopper for limiting the swingable rotation of said box member in one direction; and biasing means for biasing said box member in said one direction.

8. A bus bar switch as claimed in claim 7, further comprising seals which are attached to the inside surface of said box member.

* * * * *